(No Model.)
D. WILCOX.
HANDLE FOR FILES OR OTHER TOOLS.
No. 436,515. Patented Sept. 16, 1890.
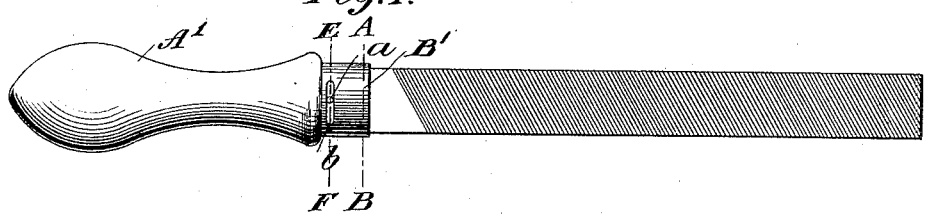
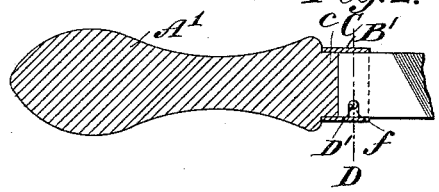
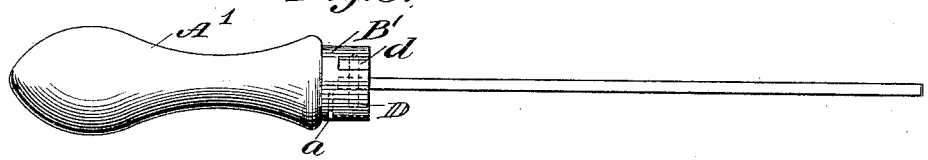
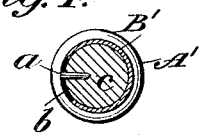  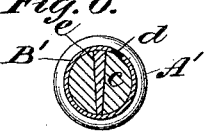
Witnesses:
D. H. Haywood
C. L. Sundgren
Inventor:
David Wilcox
By attorneys
Brown & Griswold
THE NORRIS PETERS CO., PHOTO-LITHO., WASHINGTON, D. C.

UNITED STATES PATENT OFFICE.

DAVID WILCOX, OF WARRINGTON, ENGLAND, ASSIGNOR OF ONE-HALF TO SAMUEL W. TAYLOR, OF EAST ORANGE, NEW JERSEY.

HANDLE FOR FILES AND OTHER TOOLS.

SPECIFICATION forming part of Letters Patent No. 436,515, dated September 16, 1890.

Application filed January 3, 1890. Serial No. 335,763. (No model.)

*To all whom it may concern:*

Be it known that I, DAVID WILCOX, of Warrington, county of Lancaster, England, have invented a certain new and useful Improvement in Handles for Files and other Tools, of which the following is a specification.

My improvement relates to handles for files and other tools so constructed that files or other tools without tangs may be firmly and rigidly secured to the handle.

I will describe in detail a handle embodying my improvement, together with a tool constructed to be applied to said handle, and then point out the novel features in the claim.

In the accompanying drawings, Figure 1 is a side elevation of a tool-handle embodying my improvement, showing a file secured thereto. Fig. 2 is a vertical section of the same, a portion of the file being broken away. Fig. 3 is a view taken at right angles to Fig. 1 and showing the edge of the file. Fig. 4 is a cross-section on the line E F, Fig. 1. Fig. 5 is a cross-section on the line C D, Fig. 2. Fig. 6 is a cross-section on the line A B, Fig. 1.

Similar letters of reference designate corresponding parts in all of the figures.

A' designates a handle, which may be of wood, metal, or other suitable material. Projecting radially from this handle is a pin or projection $a$. The pin or projection extends loosely through a circumferentially-extending slot $b$, formed in a ferrule B', which ferrule loosely surrounds a shank $c$, with which the handle is provided. The ferrule may be turned freely upon said shank, but is prevented from being moved off from the same by the pin $a$. The ferrule is also provided with a slot $d$, extending parallel to the axis thereof, but not wholly across the ferrule, as shown more clearly in Fig. 3. The shank $c$ of the handle is provided with a radially-extending slot $e$, which slot in the example extends wholly across the said shank and is somewhat tapered. Extending transversely across this slot near one end thereof is a projection D'. Should the handle and shank be made of metal, this projection may be cast integral with the shank. Should, however, the shank be made of wood, said projection may consist of a pin driven through the shank and across the said slot. Tools to be secured to this handle are provided with a notch $f$ near their butts. The ferrule having been rotated into such a position that the slot $d$ will be opposite the slot in the shank, the butt or heel of the tool may be passed inwardly until the notch therein extends about the projection D'. The ferrule is then rotated until the solid portion thereof is opposite the slot in the shank, thus securing the tool to the handle and preventing its accidental displacement.

It will be seen that by my improvement a very simple and effective means is provided for securing tools to handles which dispenses with the use of tangs upon the handles and admits of the use of tools originally provided with tangs, but from which the tangs have been broken off, as all that is necessary to adapt them for use with the handle is to file or otherwise form in them a notch, as described.

What I claim as my invention, and desire to secure by Letters Patent, is—

A tool-handle comprising a shank having a radially-extending slot, a ferrule loosely surrounding said shank and provided with both a circumferentially-extending slot and a slot extending parallel to the axis of said shank, a pin extending from said shank through said circumferentially-extending slot, and a pin or projection extending across the radially-extending slot in the shank, substantially as specified.

DAVID WILCOX.

Witnesses:
WILLIAM HENRY HARRISON,
THOMAS JAMES GARNETT.